United States Patent [19]
Arimilli et al.

[11] Patent Number: 6,021,468
[45] Date of Patent: Feb. 1, 2000

[54] CACHE COHERENCY PROTOCOL WITH EFFICIENT WRITE-THROUGH ALIASING

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 08/992,788

[22] Filed: Dec. 17, 1997

Related U.S. Application Data

[63] Continuation-in-part of application No. 08/839,545, Apr. 14, 1997.

[51] Int. Cl.[7] .................................................... G06F 12/08
[52] U.S. Cl. ........................ 711/122; 711/138; 711/142; 711/144; 711/145; 711/146
[58] Field of Search ................................ 711/122, 138, 711/142, 144, 145, 146

[56] References Cited

U.S. PATENT DOCUMENTS 5,671,391  9/1997  Knotts ....................................... 711/143
5,787,478  7/1998  Hicks et al. ............................. 711/141

*Primary Examiner*—Reginald G. Bragdon
*Attorney, Agent, or Firm*—Volel Emile; Jack V. Musgrove; Andrew J. Dillon

[57] ABSTRACT

A method of maintaining cache coherency in a multi-processor computer system, which avoids unnecessary writing of values to lower level caches in response to write-through store operations. When a write-through store operation is executed by a processing unit, the modified value is stored in its first level (L1) cache, without storing the value in a second level (L2) cache (or other lower level caches), and a new coherency state is assigned to the lower level cache to indicate that the value is held in a shared state in the first level cache but is undefined in the lower level cache. When the value is written to system memory from a store queue, the lower level cache switches to the new coherency state upon snooping the broadcast from the store queue. This approach has the added benefit of avoiding the prior art read-modify-write process that is used to update the lower level cache.

20 Claims, 4 Drawing Sheets

CACHE COHERENCY PROTOCOL WITH EFFICIENT WRITE-THROUGH ALIASING

CROSS-REFERENCE TO RELATED APPLICATION

This application is a continuation-in-part of U.S. patent application Ser. No. 08/839,545, filed Apr. 14, 1997.

BACKGROUND OF THE INVENTION

1. Field of the Invention

The present invention generally relates to computer systems, and more particularly to a cache-coherency protocol for a multi-level cache architecture which supports both write-back and write-through operations that affect a given cache line (write-through aliasing).

2. Description of the Related Art

The basic structure of a conventional multi-processor computer system 10 is shown in FIG. 1. Computer system 10 has several processing units, two of which, 12a and 12b, are depicted, which are connected to various peripheral devices, including input/output (I/O) devices 14 (such as a display monitor, keyboard, graphical pointer (mouse), and a permanent storage device (hard disk)), memory device 16 (such as random access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory-access channels (not shown). Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer, all of the processing units are generally identical; that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In an SMP computer, it is important to provide a coherent memory system, that is, to cause writes to each individual memory location to be serialized in some order for all processors. For example, assume a location in memory is modified by a sequence of write operations to take on the values: 1, 2, 3, 4. In a cache-coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent." Virtually all coherency protocols operate only to the granularity of the size of a cache block. That is to say, the coherency protocol controls the movement of and write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to carry out the write. The key issue is that all other processors in the system must be informed of the write by the initiating processor before the write occurs. Furthermore, if a block is present in the L1 cache of a given processing unit, it is also present in the L2 and L3 caches of that processing unit. This property is known as inclusion and is well-known to those skilled in the art. Henceforth, it is assumed that the principle of inclusion applies to the caches related to the present invention.

To implement cache coherency in a system, the processors communicate over a common generalized interconnect (i.e., bus 20). The processors pass messages over the interconnect indicating their desire to read or write memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one or more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels if present, e.g., the L3 cache. If the block is not present in the lower-level caches, the request is then presented on the generalized interconnect (20) to be serviced. Once an operation has been placed on the generalized interconnect, all other processing units snoop the operation and determine if the block is present in their caches. If a given processing unit has the block of data requested by processing unit in its L1 cache and that data is modified, by the principle of inclusion, the L2 cache and any lower-level caches also have copies of the block (however, their copies may be stale, since the copy in the processor's cache is modified). Therefore, when the lowest-level cache (e.g., L3) of the processing unit snoops the read operation, it will determine that the block requested is present and modified in a higher-level cache. When this occurs, the L3 cache places a message on the generalized interconnect informing the processing unit that it must "retry" its operation again at a later time, because the actual value of the memory location is in the L1 cache at the top of the memory hierarchy and must be retrieved to make it available to service the read request of the initiating processing unit.

Once the request from processing unit has been retried, the L3 cache begins a process to retrieve the modified data from the L1 cache and make it available at the L3 cache, main memory or both, depending on the exact details of the implementation which are not specifically relevant to this invention. To retrieve the block from the higher-level caches, the L3 cache sends messages through the inter-cache connections to the higher-level caches, requesting that the block be retrieved. These messages propagate up the processing unit hierarchy until they reach the L1 cache and cause the block to be moved down the hierarchy to the lowest-level (the L3 cache or main memory) to be able to service the request from the initiating processing unit.

The initiating processing unit eventually represents the read request on the generalized interconnect. At this point, however, the modified data has been retrieved from the L1 cache of a processing unit and the read request from the initiating processor will be satisfied. The scenario just described is commonly referred to as a "snoop push." A read request is snooped on the generalized interconnect which causes the processing unit to "push" the block to the bottom of the hierarchy to satisfy the read request made by the initiating processing unit.

The key point to note is that when a processor wishes to read or write a block, it must communicate that desire with the other processing units in the system in order to maintain cache coherence. To achieve this, the cache coherence protocol associates with each block in each level of the cache hierarchy, status indicators indicating the current "state" of the block. The state information is used to allow certain optimizations in the coherency protocol that reduce message traffic on the generalized interconnect and the inter-cache connections. As one example of this mechanism, when a processing unit executes a read, it receives a message indicating whether or not the read must be retried later. If the read operation is not retried, the message usually also includes information allowing the processing unit to determine if any other processing unit also has a still active copy of the block (this is accomplished by having the other lowest-level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive." If a block is marked exclusive, it is permissible to allow the processing unit to later write the block without first communicating with other processing units in the system because no other processing unit has a copy of the block. Therefore, in general, it is possible for a processor to read or write a location without first communicating this intention onto the interconnection. However, this only occurs in cases where the coherency protocol has ensured that no other processor has an interest in the block.

The foregoing cache-coherency technique is implemented in a specific protocol referred to as "MESI," and is illustrated in FIG. 2. In this protocol, a cache block can be in one of four states, "M" (Modified), "E" (Exclusive), "S" (Shared) or "I" (Invalid). Under the MESI protocol, each cache entry (e.g., a 32-byte block) has two bits which indicate the state of the entry, out of the four possible states. Depending upon the initial state of the entry and the type of access sought by the requesting processor, the state may be changed, and a particular state is set for the entry in the requesting processor's cache. For example, when a block is in the Modified state, the addressed block is valid only in the cache having the modified block, and the modified data has not been written back to system memory. When a block is Exclusive, it is present only in the noted block, and is consistent with system memory. If a block is Shared, it is valid in that cache and in at least one other cache, all of the shared blocks being consistent with system memory. Finally, when a block is invalid, it indicates that the addressed block is not resident in the cache. As seen in FIG. 2, if a block is in any of the Modified, Shared or Invalid states, it can move between the states depending upon the particular bus transaction. While a block in an Exclusive state can move to any other state, a block can only become Exclusive if it is first Invalid.

One of the difficulties of maintaining SMP performance as processor speeds improve is the increased load on the system memory bus. One way to lessen that impact is to increase the width of the bus and the amount of data transferred with each transaction (the "transfer burst size"). Unfortunately, this transfer size becomes the cache line size and coherency size for the system and impacts the software model if it has cache-controlling instructions, as most reduced instruction set computing (RISC) processors do. In order to prevent impacting the software, a sectored cache is implemented between the processor and the system bus. The sectored cache has a line size equal to the memory and system transfer size, with a sector size equal to the processor cache line size. This construction solves the software impact problem, but raises several design issues for the lower-level cache which is trying to maintain inclusivity and coherency.

First, whenever the higher-level cache (L1) executes a particular instruction referred to as an allocate-and-zero instruction ("DCBZ" in the PowerPC™ instruction set), it is modifying data in its cache (zeroing it) without first fetching the old data from memory. This operation is commonly performed when reallocating memory areas to a new process. The lower-level cache also needs to allocate and zero its cache line, but it has a larger cache line. The conventional method of implementing this procedure is to read the larger line from memory and then zero out the portion corresponding to the processor cache line. This approach, however, defeats the entire purpose of the operation which is to avoid reading data from memory that is going to be reallocated anyway. Furthermore, it is likely that the processor will, in a very short time span, allocate-and-zero additional cache lines which would fall into the remaining portion of the larger cache line in the lower-level cache (although the lower-level cache cannot assume this is the case). So the first problem is keeping track of sectors that are valid in the higher-level (e.g., L1) cache but are not yet valid in lower-level caches (e.g., L2 or L3).

A second problem is how to efficiently support cachable write-through operations, which are commonly used by, e.g., graphic device drivers (such as for a video display monitor). A large amount of data is often referenced in this case, but only a small amount is modified. The modified data is required to be visible to the graphics device outside of the processor in a timely manner, so the cachable write-through protocol is used. This protocol requires allocating the line containing the modified data in all levels of caches to maintain inclusion, but complicates the implementation due to the write-through operation which would require partial line-write capability (an expensive and complicated feature) to keep the caches consistent, or flushing and invalidating the line when it is written, which would negatively impact performance since the line needs to be fetched again the next time it is referenced.

A third problem relates to a feature referred to as "write-through aliasing." Most processor architectures have a memory management design that associates logical addresses (used by the processing core) with physical addresses in RAM, by providing contiguous pages of physical memory that are mapped to virtual pages. A page frame table provides entries that are used to map logical addresses to particular physical memory pages. In some processor architectures, the page frame table entries include a flag (the "W" bit) that marks each page (and corresponding cache lines) as "write-through" or "store-in." For a write-through cache line, when a modified value is placed in the cache, it is also immediately written to the lowest level of the memory hierarchy, i.e., RAM. For a store-in (or "write-back") cache line, when a modified value is placed in the cache, it is not immediately written to RAM but, rather, is held in the cache until such time as it is deallocated and then the modified value is written to RAM, effectively increasing bus bandwidth. Some operating systems allow two virtual pages to be mapped to the same physical memory page, but with different W bit settings, i.e., one virtual page is store-in (W=0), and the other virtual page is write-through (W=1). This situation particularly occurs, again, in graphics applications, i.e., where some modified values need to be written immediately to a portion of memory used by a display device. The feature of allowing a write-through virtual page to be mapped to the same physical page as a store-in virtual page is known as write-through aliasing.

One inefficiency that arises with write-through aliasing relates to storing the modified value in lower level caches, such as the L2 cache. Consider the case wherein a processor issues a write-through store operation. The new value will be immediately written to RAM, so the processor's L1 cache will hold the value in a Shared state. The new value will also be stored in the L2 cache, but this step may be unnecessary since it is already in the L1 cache, which can provide the value to the master processor, and it is also already in system RAM which can provide the value to other processors. Moreover, the process by which the L2 cache becomes updated is overly complicated, due to differences in the granularity (line sizes) of the processor and the system bus, as noted above. For example, a processor (and its L1 cache) may have a granularity of 32 bits (4 bytes), while the system bus (and L2 caches) may have a granularity of 64 bits (8 bytes). If a store operation occurs, any value to be written to the L2 cache constitutes only part (half) of the cache line. In order to store the 4-byte value in the L2 more complicated steps must therefore be taken. One approach is to apply a read-modify-write operation to that cache block. The old cache block is read into a temporary (64-byte) buffer in the L2 cache controller, the new 4 bytes are merged into this register, and then the new 64-byte line is re-written to the cache block. This process is unduly cumbersome and makes the L2 less efficient. Another approach is to use cache arrays having appropriate hardware for byte-write capability, but these circuits also slow down the cache, and add another level of complexity. It would, therefore, be desirable and advantageous to devise a method of maintaining cache coherency which supports write-through aliasing without the necessity of updating lower level caches on write-through store operations.

SUMMARY OF THE INVENTION

It is therefore one object of the present invention to provide an improved method of maintaining cache coherency in a multi-processor computer system having sectored lower-level caches.

It is another object of the present invention to provide such a method that supports write-through aliasing.

It is yet another object of the present invention to provide such a method that allows write-through store operations without requiring complicated partial-write capability.

The foregoing objects are achieved in a method of maintaining cache coherency in a multi-processor computer system, generally comprising the steps of storing a value in a first-level cache of a first processing unit, in response to a write-through store operation executed by the first processing unit, without storing the value in a second-level (L2) cache of the first processing unit, and providing an indication (i.e., a new coherency state) at the second-level cache that the value is held in a shared state in the first-level cache but is undefined in the second-level cache. The value is also written to the system memory device, by transmitting the value from a processor core of the first processing unit to a store queue of the first processing unit, and then transmitting the value from the store queue to a system bus. The L2 cache switches to the new coherency state upon snooping the broadcast from the store queue. The L2 cache then provides different responses depending upon various coherency inquiries presented by that or another processing unit. For example, if an inquiry is presented by a second processing unit regarding a request by the second processing unit to read a memory block of the system memory device corresponding to the value, then the response from the L2 cache indicates that the value is shared by the first processing unit. If, however, an inquiry is presented by a second processing unit regarding a request by the second processing unit to modify the value, then the response from the L2 cache indicates that the value is not validly held in the L2 cache. In this case, the coherency state of the L2 cache switches to an invalid state, and the L1 cache line is marked invalid.

With this new protocol, write-through store operations are more efficiently supported by allowing the operation to complete without requiring storing of the value in the L2 cache. This approach has the added benefit of avoiding complicated procedures which must take place if the granularity (cache line size) of the L1 cache is smaller than that of the L2 cache, such as by using a read-modify-write process or using hardware that has byte-write capability.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
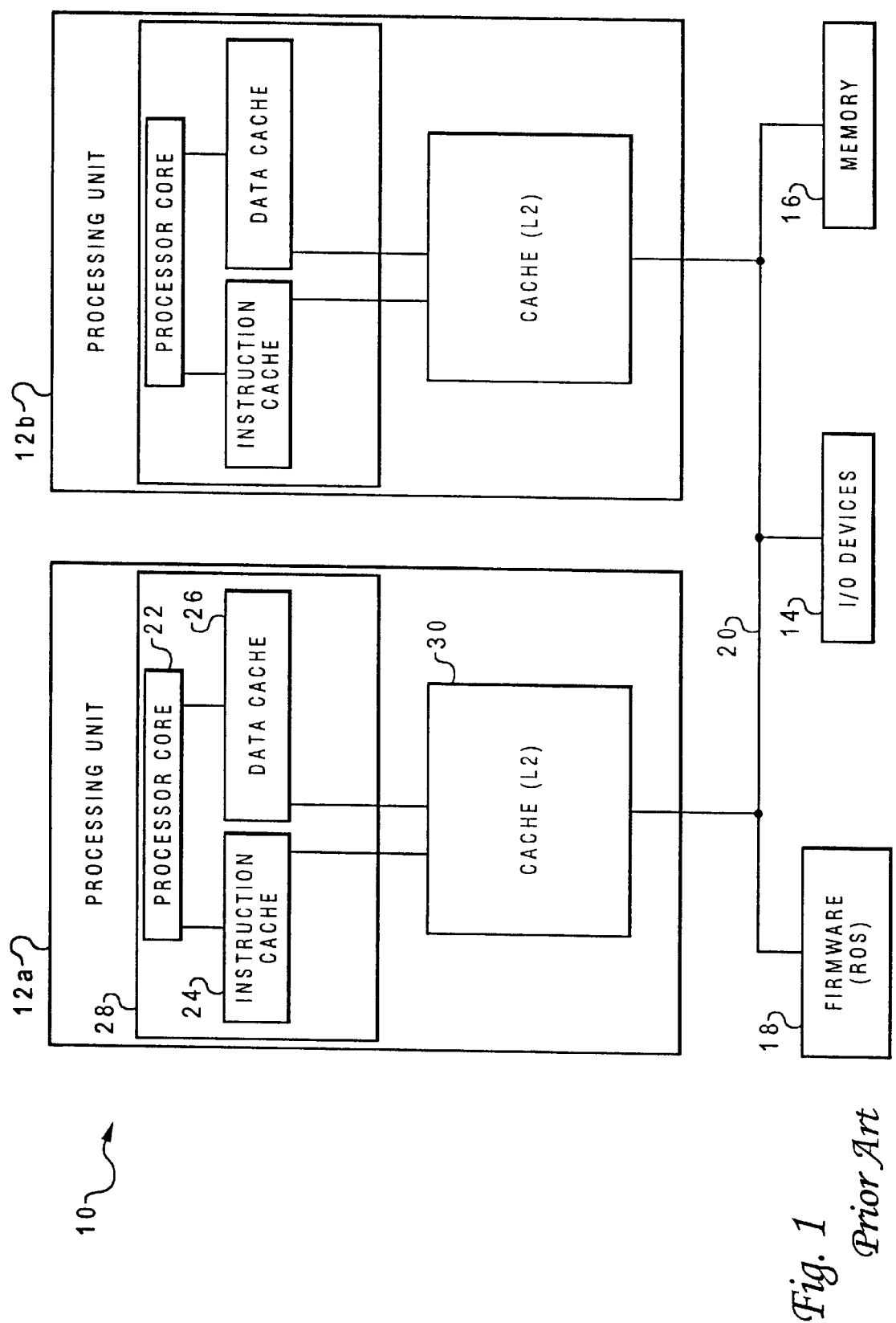
FIG. 1 is a block diagram of a prior-art multi-processor computer system.

The present invention is directed to a method of maintaining cache coherency in a multi-processor system, such as the system of FIG. 1, but the present invention could be applied to computer systems that are not necessarily conventional, i.e., they could include new hardware components not shown in FIG. 1, or have a novel interconnection architecture for existing components. Therefore, those skilled in the art will appreciate that the present invention is not limited to the generalized system shown in that figure.

Figure 3:
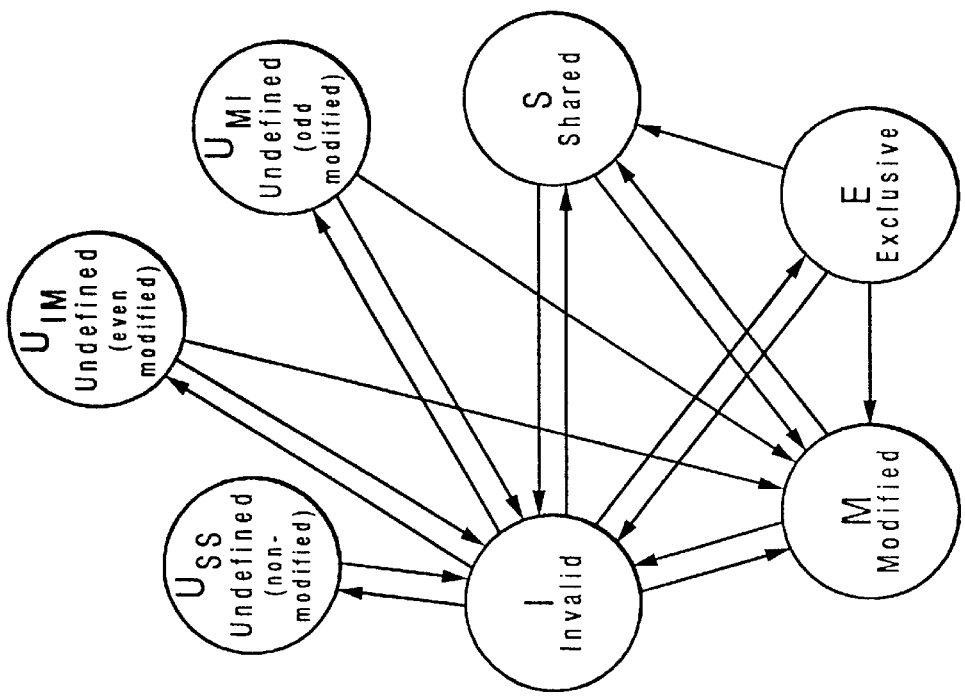
FIG. 3 is a state diagram depicting one embodiment of the cache-coherency protocol of the present invention.
Figure 2:
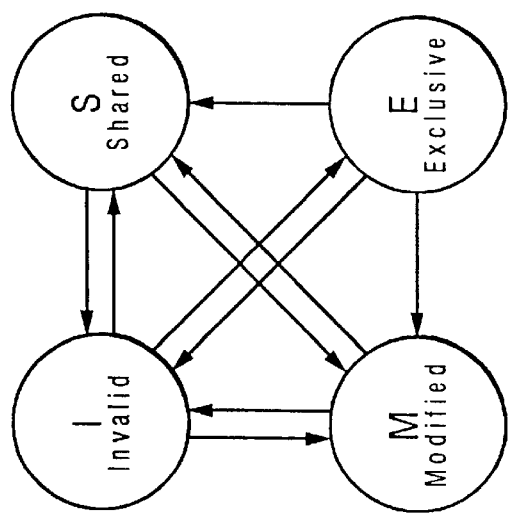
FIG. 2 is a state diagram depicting a prior art cache-coherency protocol (MESI)

With reference now to FIG. 3, there is depicted a state diagram of one embodiment of the cache-coherency protocol of the present invention. This protocol is similar to the prior art MESI protocol of FIG. 2, in that it includes the same four states (Modified, Exclusive, Shared and Invalid), but also includes three new "U" states, for upstream, undefined sector, as explained further below; this new protocol is referred to herein as the "U-MESI" protocol. As with the prior art protocol, the four M-E-S-I states may change based on the initial state of the entry and the type of access sought by the requesting processor. The manner in which these four states change is generally identical to the prior art MESI protocol, with the exceptions noted below.

In the depicted embodiment, the U-MESI protocol is adapted for a cache having cache lines with two sectors. In this embodiment, there are three "U" states due to the three possible cases wherein: (1) the first of the two sectors (the "odd" sector) is modified; (2) the second of the two sectors (the "even" sector) is modified; and (3) neither of the sectors is modified (they are both shared as a result of a cachable write-through operation). The first of these states is referred to herein as "$U_{IM}$," while the second of these states is referred to herein as "$U_{MI}$," and the third state is referred to herein as "$U_{SS}$." In this implementation of the U-MESI protocol, each cache entry now has three bits which indicate the state of the entry, out of the seven possible states (the four prior-art states, and the three new "U" states). If more than two sectors were provided in a cache line, then additional "U" states would be required (and additional bits in the cache entry).

Table 1 shows the cache transitions involving the highest level (L1) operations:

TABLE 1

| | Highest Level (L1) Operation | Lower Level cache transition |
| --- | --- | --- |
| 1 | DCBZ--even sector | I → $U_{IM}$ |
| 2 | DCBZ--odd sector | I → $U_{MI}$ |
| 3 | DCBZ--even sector | $U_{MI}$ → M |
| 4 | DCBZ--odd sector | $U_{IM}$ → M |
| 5 | Read/RWITM | $U_{MI}|U_{IM}$ → I |
| 6 | Any L1 read "hit" | $U_{SS}$ → $U_{SS}$ |
| 7 | Cachable write-through read | I → $U_{SS}$ |
| 8 | Any other operation | normal MESI |

In the first of the entries in Table 1, when a DCBZ operation (which is a write-type operation) is performed on an even sector (the second sector) in the cache line of the L1 cache, any corresponding lower-level caches in the "I" (Invalid) state will undergo a transition to "$U_{IM}$," i.e., only the second sector is noted as being modified. In the second entry in Table 1, when a DCBZ operation is performed on an odd sector (the first sector) in the cache line of the L1 cache, any corresponding lower-level caches in the "I" (Invalid) state will undergo a transition "$U_{MI}$," i.e., only the first sector is noted as being modified.

If a DCBZ operation is performed on an even sector when the odd sector of the same line has previously undergone a DCBZ operation and the corresponding lower-level caches are in the "$U_{MI}$" state (the fourth entry in Table 1), or if a DCBZ operation is performed on an odd sector when the even sector of the same line has previously undergone a DCBZ operation and the corresponding lower-level caches are in the "$U_{IM}$" state (the fourth entry in Table 1), then the lower-level caches will undergo a state transition to the "M" (Modified) state to indicate that the entire line is modified. If, however, only one DCBZ operation has previously occurred for a given line and the lower-level caches have that line at a "$U_{IM}$" or "$U_{MI}$" state, and the other (Invalid) line is the subject of a "read" or "read with intent to modify" (RWITM) operation, then the lower-level cache lines go to "I" (Invalid), and the modified sector (M-sector) is flushed from the higher-level cache. After the transition to the Invalid state, normal MESI rules apply.

In the sixth entry of Table 1, if an L1 read "hit" occurs against the subject block, and the lower-level caches are in the "$U_{SS}$" state, they will remain in that state, i.e., it is shared in the L1 cache. If a cachable/write-through read operation is performed on the block (the seventh entry in Table 1), and the lower-level caches have the corresponding block in an "I" (Invalid) state, then they undergo a transition to the "$U_{SS}$" state. Finally, as noted in entry eight of Table 1, all other L1 operations not specified above undergo a normal transition, i.e., according to the prior-art MESI protocol.

Table 2 shows how system bus snooped transactions will influence the caches in the "U" states:

TABLE 2

| | Bus operation | Snooper state | Coherency response |
|---|---|---|---|
| 1 | Any snoop "hit" | $U_{IM} \to I$ | Retry |
| 2 | Any snoop "hit" | $U_{MI} \to I$ | Retry |
| 3 | Non-read snoop "hit" | $U_{SS} \to I$ | Retry |
| 4 | Read snoop "hit" | $U_{SS} \to U_{SS}$ | Shared |

In the "U" states, the cache knows it must take action but must forward the snoop upstream to determine the proper action. Table 2 shows only those rare cases where a snoop hit occurs against one of the "U" states. In these situations, the lower-level cache will flush the contents of the upstream cache and move to the "I" (Invalid) state, and issue a "Retry" response, except where a read snoop hit occurs against a "$U_{SS}$" state, in which the coherency response is "Shared."

Figure 4:
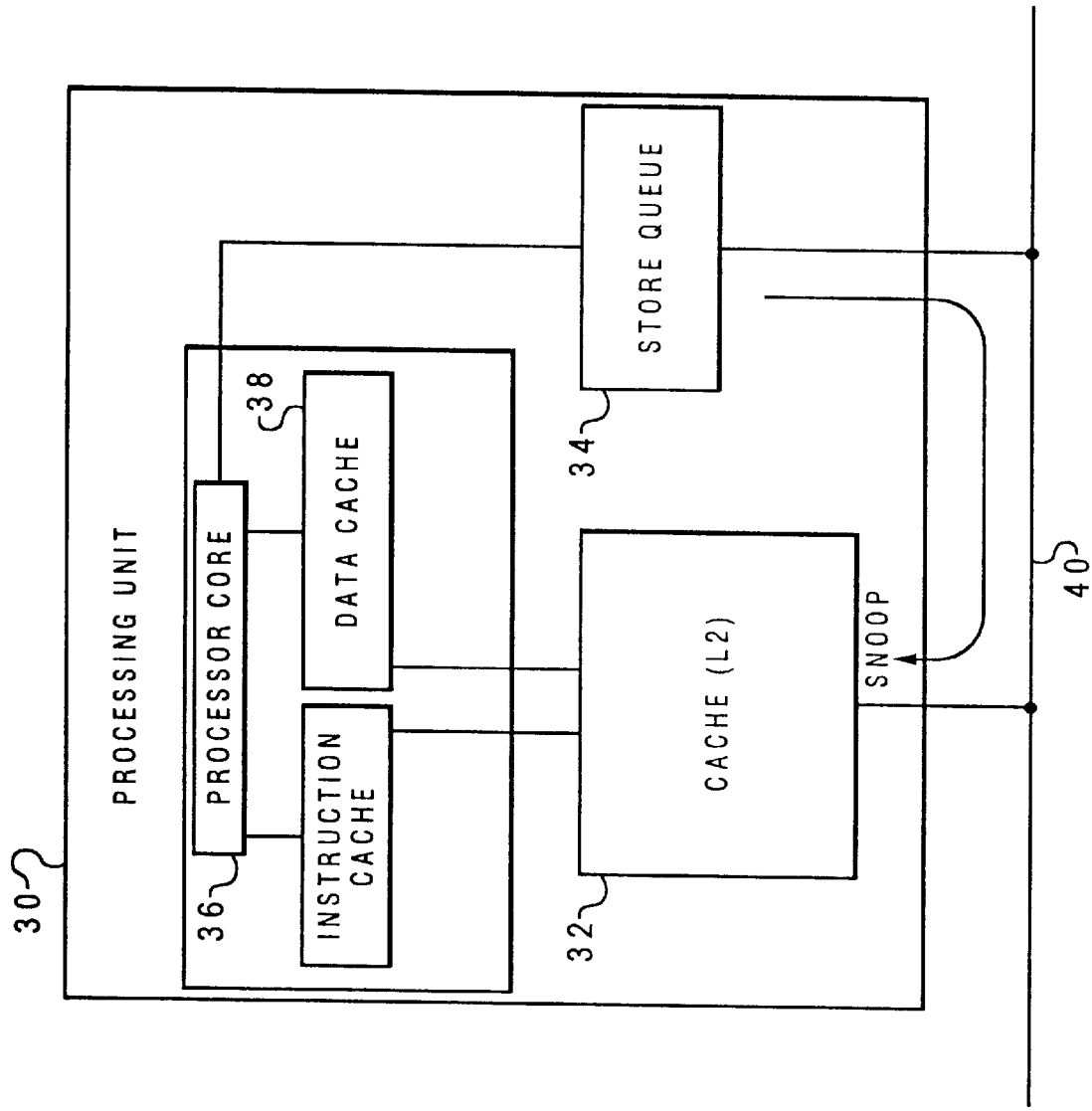
FIG. 4 is a block diagram illustrating how a lower level cache snoops a store operation issued by its own processor, according to the present invention and, in response thereto, switches to a unique coherency state.

The foregoing U-MESI protocol addresses the DCBZ instruction with respect to sectored L2 cache (with $U_{MI}$ and $U_{IM}$), and write-through read operations (with $U_{SS}$, but does not address write-through aliasing operations. As noted above in the Description of Related Art, if a write-through store operation occurs, prior art cache coherency models require that the L2 cache be updated with the new value, but the present invention can also be applied in such a case to provide more efficient operation of the L2 cache. With reference to FIG. 4, in a further implementation of the present invention, a state similar to the Uss state can be applied to the L2 cache in such a case, although by a different mechanism. Consider a processing unit 30 having an L2 cache 32 and a store queue 34 which is used for non-cacheable store operations and write-through store operations. When the processor core 36 issues a write-through store operation (usually on data, not instructions), the modified value is stored in the L1 data cache 38, and written to system memory by store queue 34, but the operation is not transmitted from L1 cache 38 to L2 cache 32. Instead, when the operation is broadcast to the system bus 40 by store queue 34, L2 cache 32 snoops the operation. L2 cache 32 knows that the operation originated from its own processor, since the bus tag for the operation includes a field for the processor ID. Therefore, L2 cache 32 knows that the new value is already properly stored in L1 cache 38 (in a Shared state), and so it is not necessary to additionally load the value into L2 cache 32.

L2 cache 32 also knows, however, that it does not contain a valid copy of the value, and so it must change its coherency state to reflect this. As with the $U_{SS}$ state, this new coherency state indicates that the value is valid and shared above in L1 cache 38 (if it has not been otherwise deallocated), but is undefined at the L2 level. Rather than using the same $U_{SS}$ label, however, it is preferable to use another state identifier since this new state is entered in a different way and can be implemented independently of the $U_{SS}$ state. This new, unique state is hereafter referred to as "$W_{SS}$" or simply "W" (reflecting that it arose from a write-through store operation). In this manner, coherency is maintained without the need to store the modified value in the L2 cache (or in any lower level cache, i.e., L3, etc.). The $W_{SS}$ state can generally be entered only when a lower level cache snoops a write-through store operation issued by its own processor.

Figure 5:
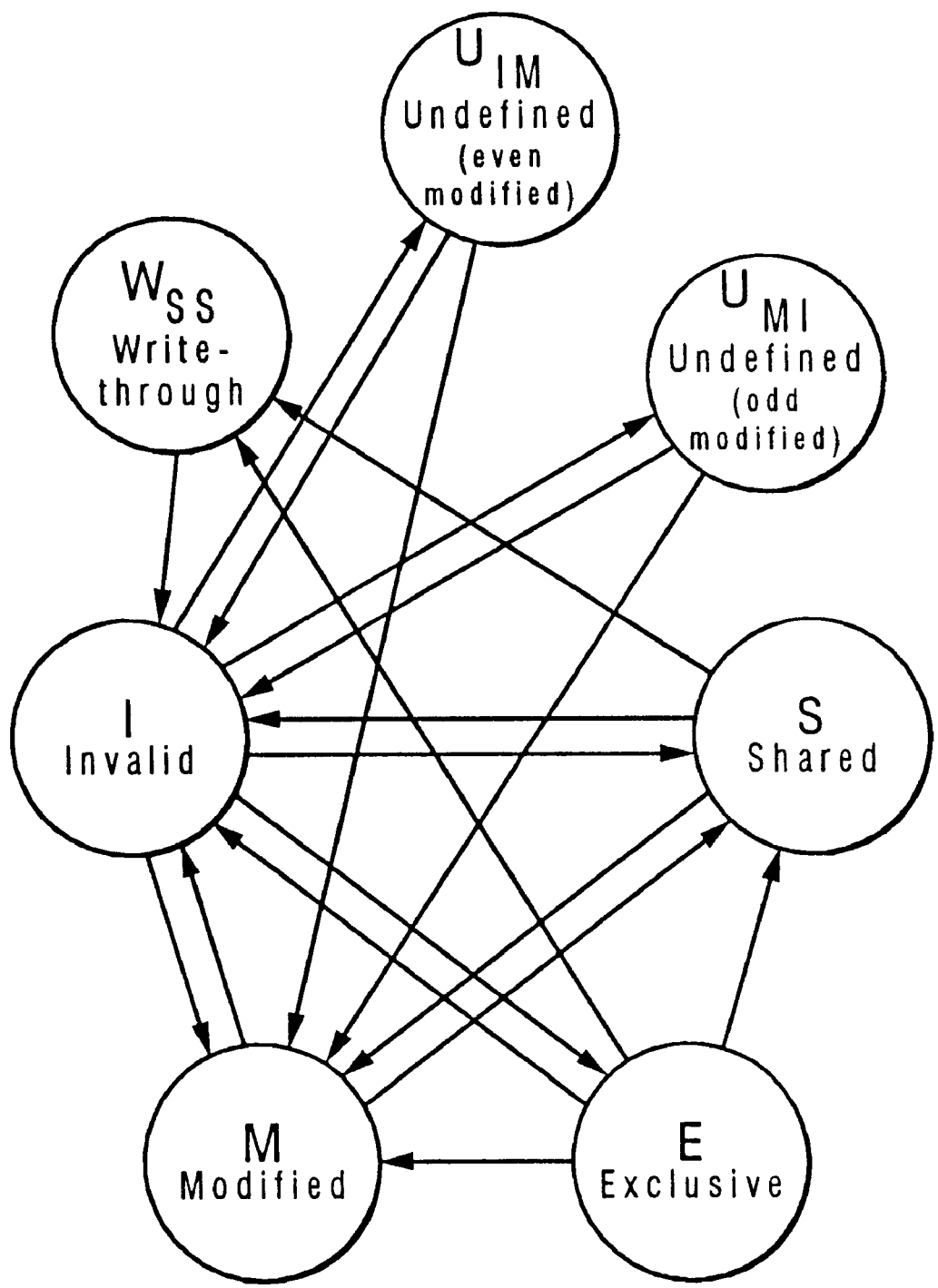
FIG. 5 is a state diagram depicting another embodiment of the cache-coherency protocol of the present invention.

The $W_{SS}$ state can be further understood by examining various responses of a cache line which is in this state. If L2 cache 32 has a line in the $W_{SS}$ state, and a different processor issues a read operation for that line, L2 cache 32 will snoop the read operation and respond "shared." The L2 cache will not provide the value through intervention since it does not have the latest copy of the value. If the L2 cache snoops an operation other than a read (i.e., a RWITM, flush, etc.), then it simply switches to an Invalid state and invalidates the L1 line. In this respect, the $W_{SS}$ state appears like the Shared state to lower level memory objects (e.g., the system bus, or lower level caches like an L3 cache). The same processor that is associated with the L2 cache holding a line in the $W_{SS}$ state can also issue operations directed to that cache line; if the value is still in the L1 cache then the L2 cache is unaffected but, if the value is not in the L1 cache (e.g., it has been deallocated by an LRU algorithm), then the L2 cache must read the value from system memory. In this respect, the $W_{SS}$ state appears like the Invalid state to higher level memory objects. FIG. 5 illustrates state transitions using the $W_{SS}$ state in conjunction with the $U_{IM}$ and $U_{MI}$ states.

With the $W_{SS}$ state, the problems mentioned above are solved, i.e., keeping track of sectors that are valid in higher levels without executing unnecessary bus operations, and efficiently supporting cachable write-through store operations. The results are increased memory bandwidth and the freeing up of address bandwidth, as well as effective byte-write capability. The $W_{SS}$ state can further be used without adversely affecting other coherency enhancements. For example, it can be used in conjunction with the R-MESI protocol described in U.S. patent application Ser. No. 08/839,557.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method of maintaining cache coherency in a multi-processor computer system having a system memory device and a plurality of processing units, each processing unit having a cache hierarchy including at least first- and second-level caches, the method comprising the steps of:

storing a value in a first-level cache of a first processing unit, in response to a write-through store operation executed by the first processing unit, without storing the value in a second-level cache of the first processing unit;

writing the value to the system memory device; and providing an indication at the second-level cache that the value is held in a shared state in the first-level cache but is undefined in the second-level cache.

2. The method of claim 1 wherein said writing step further includes the steps of:

transmitting the value from a processor core of the first processing unit to a store queue of the first processing unit; and transmitting the value from the store queue to a system bus.

3. The method of claim 2 wherein said indicating step is performed in response to the second-level cache snooping a broadcast associated with said transmitting of the value from the store queue to the system bus.

4. The method of claim 1 further comprising the steps of:

deallocating the value from the first-level cache; and loading the value from the system memory device into the first-level cache and the second-level cache, after said deallocating step, in response to a request from the first processing unit to read the value.

5. The method of claim 1 further comprising the step of responding to an inquiry from a second processing unit regarding a request by the second processing unit to read a memory block of the system memory device corresponding to the value.

6. The method of claim 5 wherein said responding step includes the step of issuing a response indicating that the value is shared by the first processing unit.

7. The method of claim 1 further comprising the steps of:

issuing an inquiry from a second processing unit regarding a request by the second processing unit to modify the value; and sending a response to the inquiry indicating that the value is not validly held in the second-level cache.

8. The method of claim 7 further comprising the step of providing a different indication, in response to the inquiry, that the value is not validly held in the second-level cache.

9. The method of claim 8 further comprising the step of flushing the value from the first-level cache in response to the inquiry.

10. The method of claim 7 further comprising the step of flushing the value from the first-level cache in response to the inquiry.

11. A computer system comprising:

a memory device;

a bus connected to said memory device;

a plurality of processing units connected to said bus, each processing unit having at least a first-level cache and a second-level cache; and cache coherency means for providing an indication that a value is held in a shared state in a first-level cache of a first processing unit but is undefined in a second-level cache of said first processing unit, as a result of a write-through store operation executed by a processor core of said first processing unit.

12. The computer system of claim 11 further comprising means for transmitting the value from said processor core of said first processing unit to a store queue of said first processing unit, and for transmitting the value from said store queue to said bus.

13. The computer system of claim 12 wherein said cache coherency means provides said indication in response to said second-level cache snooping a broadcast associated with said transmitting of the value from said store queue to said bus.

14. The computer system of claim 11 further comprising means for deallocating the value from said first-level cache, and for loading the value from said memory device into said first-level cache and said second-level cache, after said deallocating of the value, in response to a request from said first processing unit to read the value.

15. The computer system of claim 11 wherein said cache coherency means further includes means for responding to an inquiry from a second processing unit regarding a request by said second, processing unit to read a memory block of said memory device corresponding to the value.

16. The computer system of claim 15 wherein said responding means issues a response indicating that the value is shared by said first processing unit.

17. The computer system of claim 11 wherein said cache coherency means further includes means for issuing an inquiry from a second processing unit regarding a request by said second processing unit to modify the value, and for sending a response to said inquiry indicating that the value is not validly held in said second-level cache.

18. The computer system of claim 17 wherein said cache coherency means provides a different indication, in response to said inquiry, that the value is not validly held in said second-level cache.

19. The computer system of claim 18 wherein said cache coherency means further includes means for flushing the value from said first-level cache in response to said inquiry.

20. The computer system of claim 17 wherein said cache coherency means further includes means for flushing the value from said first-level cache in response to said inquiry.

* * * * *